Patented Nov. 6, 1923.

1,473,550

UNITED STATES PATENT OFFICE.

HEINRICH GRÜNHAGEN, OF BERLIN-KARLSHORST, GERMANY, ASSIGNOR TO ACTIEN GESELLSCHAFT FÜR ANILIN FABRIKATION, OF BERLIN, GERMANY.

2.7-DIALKYL-3-DIALKYLAMINO-6-AMINO-10-ALKYLACRIDINIUM SALTS.

No Drawing.   Application filed March 10, 1922.   Serial No. 542,751.

*To all whom it may concern:*

Be it known that I, HEINRICH GRÜNHAGEN, a citizen of the German Republic, residing at Berlin-Karlshorst, Germany, have invented certain new and useful Improvements in 2.7-Dialkyl-3-Dialkylamino-6-Amino-10-Alkylacridinium Salts, of which the following is a specification.

I have found that valuable derivatives of the acridine series may be obtained by treating 2.7-dimethyl-3-dimethylamino-6-aminoacridine with alkylating agents in the presence of a diluting medium.

The products thus obtained are salts of the bases corresponding to the general formula:

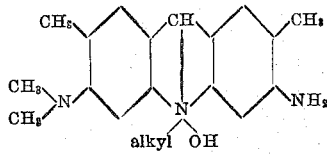

They form in the dry pulverized shape of their halogen salts reddish brown powders, easily soluble in water and soluble in alcohol, the diluted aqueous solution showing a greenish fluorescence. They dissolve in concentrated sulfuric acid with a yellow color; by addition of sodium hydroxide to the concentrated aqueous solution a yellowish precipitate separates, soluble in water, becoming partly insoluble in water if heated for some hours; by heating with oxidizing agents, for example with chlorinated lime they are destroyed. They dye on cotton mordanted with tannic acid and on leather clear yellow tints; their aqueous solutions are excellent disinfectants.

In order to illustrate my invention, I give the following examples, without limiting it, the parts being by weight:

1. 30 parts of 2.7-dimethyl-3-dimethylamino-6-aminoacridine are suspended in 75 parts of methyl alcohol. A solution of 14 parts of methylbromide in 30 parts of methyl alcohol is added and the mixture is heated in an autoclave for 6 hours to 130° C. The product of reaction freed from the alcohol by distillation is dissolved in 1000 parts of water. To the solution heated to the boiling point sodium carbonate is added until the reaction has become weakly alkaline. The methylacridinium bromide is separated of the hot filtered solution by addition of a solution of sodium chloride. By heating with an excess of sodium hydroxide the acridinium base is separated from which, with hydrochloric acid, the chloride may be obtained.

2. 30 parts of 2.7-dimethyl-3-dimethylamino-6-aminoacridine are stirred in a closed vessel with 60 parts of methyl alcohol. After further addition of 150 parts of methyl alcohol 21 parts of methyl chloride are passed into the solution. The mixture is heated during 6 hours to 140–145° C. The product of reaction is separated in the manner described in example 1.

3. 30 parts of 2.7-dimethyl-3-dimethylamino-6-aminoacridine are well mixed with 120 parts of ethyl-alcohol 45 parts of ethylbromide are added and the mixture is heated for 6–8 hours in an autoclave to 135–140° C. The product of reaction is separated and finished in the manner described in Example 1.

Having now described my invention and the manner in which it may be performed what I claim is,—

1. As new products of manufacture the hereindescribed new derivatives of the acridine series being in the dry pulverized shape of their halogen salts reddish brown powders, easily soluble in water, soluble in alcohol, the diluted aqueous solution showing a greenish fluorescence, dissolving in concentrated sulfuric acid with a yellow color, the concentrated aqueous solution separating by addition of sodium hydroxide a yellowish precipitate which is soluble in water and which becomes partly insoluble by heating for some time, being destroyed by heating with chlorinated lime, dyeing on leather clear yellow tints and corresponding in the free state of bases to the general formula:

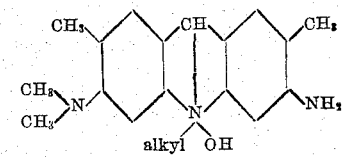

2. As new products of manufacture the herein described new derivatives of the acridine series being in the dry pulverized shape of their halogen salts reddish brown powders, easily soluble in water, soluble in alcohol, the diluted aqueous solution showing a greenish fluorescence, dissolving in concentrated sulfuric acid with a yellow color, the concentrated aqueous solution separating by addition of sodium hydroxide a yellowish precipitate which is soluble in water and which becomes partly insoluble by heating for some time, being destroyed by heating with chlorinated lime, dyeing on leather clear yellow tints and corresponding in the free state of the base to the formula:

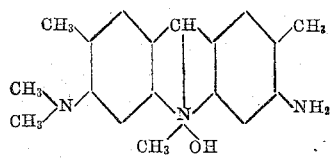

3. As a new product of manufacture the hereindescribed 2.7-dimethyl-3-dimethylamino-6-amino-10-methylacridinium hydrochloride, being in the dry pulverized shape a reddish brown powder, easily soluble in water, soluble in alcohol, the diluted aqueous solution showing a greenish fluorescence, dissolving in concentrated sulfuric acid with a yellow color, the concentrated aqueous solution separating by addition of sodium hydroxide a yellow precipitate which is soluble in water and which becomes partly insoluble by heating for some time, being destroyed by heating with chlorinated lime, dyeing on leather clear yellow tints and corresponding to the formula:

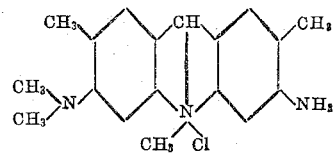

In testimony whereof I have affixed my signature in presence of two witnesses.

HEINRICH GRÜNHAGEN.

Witnesses:
E. HOLTZERMAN,
JOHN W. BULKLEY.